United States Patent [19]

Broekhuis

[11] Patent Number: 4,530,985
[45] Date of Patent: Jul. 23, 1985

[54] PROCESS FOR THE PREPARATION OF POLYMERS COMPRISING CONJUGATED DIENES AND OPTIONALLY MONOALKENYL AROMATIC HYDROCARBONS

[75] Inventor: Antonius A. Broekhuis, Amsterdam, Netherlands

[73] Assignee: Shell Oil Company, Houston, Tex.

[21] Appl. No.: 641,637

[22] Filed: Aug. 17, 1984

[30] Foreign Application Priority Data

Mar. 23, 1984 [GB] United Kingdom ................ 8407629

[51] Int. Cl.$^3$ .............................................. C08F 4/48
[52] U.S. Cl. .................................... 526/181; 525/250
[58] Field of Search ...................... 526/181, 335, 340

[56] References Cited

U.S. PATENT DOCUMENTS

| | | | |
|---|---|---|---|
| 4,230,841 | 10/1980 | Prudence | 526/181 |
| 4,334,567 | 6/1982 | Bond | 526/340 |
| 4,367,325 | 1/1983 | Takeuchi | 526/340 |
| 4,387,756 | 6/1983 | Ogawa | 526/340 |
| 4,397,994 | 8/1983 | Takeuchi | 526/181 |
| 4,436,873 | 3/1984 | Furukawa | 526/335 |

*Primary Examiner*—Paul R. Michl

[57] ABSTRACT

Process for the preparation of polymers comprising conjugated dienes and optionally monoalkenyl aromatic hydrocarbons, which process comprises the polymerization of conjugated diene and optionally monoalkenyl aromatic hydrocarbon monomers in the presence of a hydrocarbon diluent, and a hydrocarbyl alkalimetal compound and a Lewis base having the formula

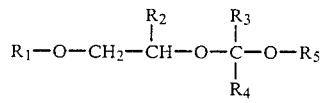

wherein
$R_1$ is an alkyl group having 2–18 carbon atoms;
$R_2$ and $R_3$ are hydrogen or an alkyl groups having 1–4 carbon atoms;
$R_4$ is hydrogen or an alkyl group having 1–6 carbon atoms; and
$R_5$ is an alkyl group having 1–18 carbon atoms.

11 Claims, No Drawings

PROCESS FOR THE PREPARATION OF POLYMERS COMPRISING CONJUGATED DIENES AND OPTIONALLY MONOALKENYL AROMATIC HYDROCARBONS

The present invention is concerned with a process for the preparation of polymers comprising conjugated dienes and optionally monoalkenyl aromatic hydrocarbons, which process comprises polymerizing conjugated diene and optionally monoalkenyl aromatic hydrocarbon monomers in the presence of a hydrocarbon diluent, a hydrocarbyl alkalimetal compound and a Lewis base.

Lewis bases may increase the vinyl content in the polymerized conjugated dienes and are generally known as modifiers. The term "vinyl content" as used here and elsewhere in this specification refers to that portion by weight of the conjugated diene incorporated in the polymer, which has polymerized at the 1,2-or 3,4-positions.

As is generally known the polymerization of conjugated dienes and optionally monoalkenyl aromatic hydrocarbons in the presence of a hydrocarbyl alkali metal compound proceeds via a living polymer, i.e. a polymer having an alkali metal at at least one of its ends. The polymerization may be terminated by killing the living polymers, i.e. removing the alkali metal moiety from the polymers, or by coupling the living polymers by means of a coupling agent like, for instance, silicon tetrachloride. Many of the modifiers which have been proposed in the past, such as the widely recommended methyldiglycol methyl ether (diglyme), tend to terminate the polymerization reaction prematurely and/or to disturb the coupling reaction. As a result of these effects the polymer obtained exhibits a wider molecular weight distribution and the monomer conversion and the coupling efficiency are relatively low.

According to the present invention a class of modifiers has been found which do not cause or reduce the aforesaid premature termination of the polymerization reaction and/or interference with the coupling reaction.

Consequently, the present invention is concerned with a process for the preparation of polymers comprising conjugated dienes and optionally monoalkenyl aromatic hydrocarbons, which process comprises polymerizing conjugated diene and optionally monoalkenyl aromatic hydrocarbon monomers in the presence of a hydrocarbon diluent, a hydrocarbyl alkalimetal compound and a Lewis base, characterized in that the Lewis base is a compound having the formula

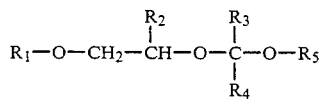

wherein
$R_1$ is an alkyl group having 2–18 carbon atoms;
$R_2$ and $R_3$ are hydrogen or an alkyl groups having 1–4 carbon atoms;
$R_4$ is hydrogen or an alkyl group having 1–6 carbon atoms; and
$R_5$ is an alkyl group having 1–18 carbon atoms.

Preferably $R_1$ is an alkyl group having 3–6 carbon atoms, $R_2$ and $R_3$ are hydrogen, and $R_4$ and $R_5$ are alkyl groups having 1–4 carbon atoms. More preferably, $R_1$ is n-butyl, $R_4$ is methyl, $R_5$ is isobutyl, while $R_2$ and $R_3$ are hydrogen.

The amount of Lewis base applied preferably ranges of from 10 to 1000 parts per million (ppm) and more preferably of from 80 to 700 ppm calculated on the total weight of diluent and monomer.

The hydrocarbon diluent may conveniently be chosen from aliphatic, cycloaliphatic or aromatic hydrocarbons having 4–10 carbon atoms, or mixtures thereof. Examples of such diluents include: n-hexane, n-heptane, 2,2,4-trimethylpentane, cyclohexane, benzene and toluene; cyclohexane being preferred. The solvent is employed in an amount of more than 100 parts by weight and preferably of from 200 to 1,500 parts by weight per 100 parts by weight of monomer.

The hydrocarbyl alkali metal compound, which is applied as initiator, is generally a hydrocarbyllithium compound, which may comprise one, two or more lithium atoms. Preferably a monolithium compound is employed. The hydrocarbyl group may be selected from aliphatic, cycloaliphatic or aromatic radicals containing 1 to 20 carbon atoms. Examples of initiators include: n-butyllithium, s-butyllithium, methyllithium, phenyllithium, naphthyllithium, S-butyllithium is the most preferred initiator.

The conjugated diene monomers employed in the process according to the present invention are generally those containing 4 to 8 carbon atoms. Examples of such suitable conjugated diene monomers are 1,3-butadiene, isoprene, 2,3-dimethyl-1,3-butadiene and piperylene; 1,3-butadiene being most preferred.

The optionally employed monoalkenyl aromatic hydrocarbons may be selected from styrene, ring substituted styrenes, such as 3-methylstyrene, 4-n-propylstyrene, 4-cyclohexylstyrene, 4-decylstyrene, 4-p-tolylstyrene and from alpha-methylstyrenes and vinylnaphthalenes. Styrene is the most preferred one.

The polymerization will generally be conducted in a period of time ranging from 2 min. to 6 h, preferably from 10 min. to 3 h and at a temperature between 20° and 100° C., preferably between 30° and 80° C.

When the polymerization reaction has progressed to the desired degree of conversion the reaction may be terminated by inactivation by methods generally known in the art. Alternatively, the living polymer may be coupled by means of a coupling agent after the polymerization reaction has been progressed to the desired degree of conversion. Coupling agents may be difunctional or multifunctional. Coupling agents known in the art may be employed. Dibromoethane as difunctional coupling agent and diethyl adipate, $CH_3SiCl_3$ and $SiCl_4$ as multifunctional coupling agents are the preferred ones. The amount of coupling agent to be applied will depend on its functionality. In general the amount of dibromomethane will range of from 0.25 to 0.75 mol per mol of initiator added and the amount of tetrafunctional coupling agents will range of from 0.1 to 0.5 mol per mol of initiator added.

The polymerization reaction or the combination of polymerization and coupling may be carried out continuously, batchwise or semi-batchwise by methods known in the art.

The modifier according to the present invention is applied in processes for the preparation of polymers comprising conjungated dienes and optionally monoalkenyl aromatic hydrocarbons comprising the preparation of (1) homopolymers of conjugated dienes, especially butadiene or isoprene; (2) copolymers of conjugated dienes, especially butadiene and isoprene; (3) block copolymers of conjugated dienes and monoalkenyl aromatic hydrocarbons, especially block copolymers comprising butadiene and styrene or isoprene and styrene; (4) tapered block copolymers of the same monomers as mentioned under (3); and (5) random copolymers of the same monomers as mentioned under (3). These processes are generally known in the art. Preferably, the modifier is applied in processes for the preparation of said homopolymers, block copolymers and random copolymers.

If homopolymers of conjugated dienes are prepared, their weight average molecular weight will range of from 1,000 to 1,000,000, determined by gel permeation chromatography.

The block copolymers which may be prepared include polystyrene-polyisoprene, polystyrene-polybutadiene, polystyrene-polyisoprene-(polyisoprene-polystyrene)$_n$, polystyrene-polybutadiene-(polybutadiene-polystyrene)$_n$, polystyrene-(polyisoprene-polystyrene)$_m$ and polystyrene-(polybutadiene-polystyrene)$_m$, wherein m ranges from 1 to 15, preferably being 1 and n ranges from 2 to 15 and preferably being 2 or 3. The linear block copolymers among these are prepared by sequential polymerization techniques or, if m=1 by a combination of sequential polymerization and coupling techniques. The branched block copolymers are prepared by a combination of sequential polymerization and coupling techniques or by sequential polymerization only, if the initiator comprises at least three lithium atoms. If the polystyrene block in these block copolymers is prepared first, the Lewis base may be present during this stage already or may be added to the reaction vessel when the conjugated diene monomers are added. In general the polystyrene blocks in these block copolymers will have a number average molecular weight of from 1,000 to 100,000, determined by gel permeation chromatography and the styrene content of these block copolymers generally will range of from 10 to 55% weight based on the weight of the block copolymer and determined by infrared spectroscopy.

Random copolymers are generally prepared by conducting the polymerization in the presence of both butadiene and styrene, which may be added batchwise, semi-batchwise or continuous. Preferably a part of both the butadiene and the styrene is added to the reaction vessel, containing already the hydrocarbon diluent and the Lewis base; after having added initiator the rest of the butadiene and styrene is fed to the reaction vessel, (optionally together with further hydrocarbon diluent, Lewis base and initiator) each at a constant or variable rate, depending on the polymer desired. The weight average molecular weight of the random copolymers prepared according to the present invention range of from 1,000 to 1,000,000 determined by gel permeation chromatography; the styrene content generally will range of from 1%w to 55%w based on the total weight of the random copolymer and determined by infrared spectroscopy. As many known Lewis bases, those according to the present invention decrease the difference in the reaction rate constant of styrene and butadiene during the copolymerization of these monomers. Hence, more styrene can be incorporated in the random copolymer from the very beginning of the reaction on, compared with the same polymerization in the absence of Lewis base.

The vinyl content in the polymers formed according to the present invention will generally range of from 25 to 75%w determined by infrared spectroscopy.

The polymers prepared according to the process of the invention may advantageously be applied in elastomeric compositions generally known in the art. For instance, these polymers are particularly suitable for application in tires.

The invention will be illustrated by means of the following examples.

EXAMPLE 1

In a 500 ml N$_2$-purged serum bottle 12 g styrene and 40 g butadiene were polymerized at 50° C. for 2.5 h in 250 ml cyclohexane in the presence of 0.4 mmol s-butyllithium and 450 ppm of a Lewis base calculated on monomer and solvent. Subsequently, the copolymer was coupled with DEAP for 30 min at 50° C. The molar ratio of s-butyllithium to DEAP was 4. The polymer was analyzed before and after coupling by means of gel permeation chromatography in order to determine the peak molecular weight before and after coupling and the coupling efficiency. The vinyl content and the amount of styrene incorporated in the copolymer were determined by infrared spectroscopy. The results and further data are given in Table 1, experiments 1-6.

EXAMPLE 2

In a 500 ml N$_2$-purged serum bottle 7 g styrene was polymerized in 250 ml cyclohexane in the presence of 0.45 mmol s-butyllithium and 600 ppm (calculated on solvent and monomers, including butadiene added in the second stage) of a Lewis base at 40° C. for 20 min. Then 40 g of butadiene was added and the polymerization was continued for 1 h at 40° C. Subsequently the block copolymer was coupled with methyl trichlorosilane for 1.5 h at 40° C. The molar ratio of s-butyllithium to methyl trichlorosilane was 2.9. The polymer was subjected to the same analysis methods as in Example 1. The results and further data are given in Table 1, experiments 7 and 8.

EXAMPLE 3

In a 500 ml N$_2$-purged serum bottle 40 g of butadiene was polymerized in 250 ml cyclohexane in the presence of 0.3 mmol s-butyllithium and 450 ppm (calculated on monomer and solvent) of a Lewis base at 50° C. for 2.5 h. Subsequently, the living polybutadiene was coupled with diethyl adipate (molar ratio s-butyllithium/diethyl adipate=4:1) for 1.5 h at 50° C. The polymer was subjected to the same analysis methods as in Example 1. Further data and the results are given in Table 1, experiments 9 and 10.

EXAMPLE 4

In a 500 ml N$_2$-purged serum bottle styrene and butadiene were co-polymerized in 250 ml cyclohexane using s-butyllithium as initiator and a varying amount of Lewis base. The polymerization was conducted for a short period in order to show the randomizing effect of the modifier on the copolymerization. The reaction was terminated by means of methanol. The polymer so obtained was subjected to infrared spectroscopy in order to determine the vinyl content and the amount of styrene incorporated in the polymer. Further data and results are given in Table 2.

TABLE 1

| | Lewis base $R_1-O-CH_2-CH(R_2)-O-C(R_3)(R_4)-OR_5$ | | | | | Peak molecular weight, $\times 10^{-3}$ | | Polymer analysis | | |
|---|---|---|---|---|---|---|---|---|---|---|
| Exp. | $R_1$ | $R_2$ | $R_3$ | $R_4$ | $R_5$ | Before coupling | After coupling | Coupling efficiency, % | Vinyl content, % w | Bound styrene, % w |
| 1 | $C_2H_5-$ | $-H$ | $-H$ | $-CH_3$ | $-C_2H_5$ | 215 | 800, 640 and 460 | 37 | 50 | 22.8 |
| 2 | $i-C_3H_7-$ | " | " | " | " | 180 | 650, 550 and 385 | 36 | 52 | 23.6 |
| 3 | $n-C_4H_9-$ | " | " | " | " | 190 | 690, 560 and 400 | 35 | 46 | 24.3 |
| 4 | " | " | " | " | $-i-C_4H_9$ | 155 | 700, 580 and 470 | 47 | 57 | 23.5 |
| 5 | " | " | " | $-H$ | $-CH_3$ | 190 | 690 and 560 | 44 | 46 | 24.4 |
| 6 | diglyme | — | — | — | — | 140 | 400 | 5 | 69 | 24.6 |
| 7 | $n-C_4H_9-$ | $-H$ | $-H$ | $-CH_3$ | $-i-C_4H_9$ | 16 (step 1) 150 (step 2) | 470 and 300 | 84 | 70 | 16 |
| 8 | diglyme | — | — | — | — | 23 (step 1) 123 (step 2) | — | 0 | 81 | 27.2 |
| 9 | $n-C_4H_9-$ | $-H$ | $-H$ | $-CH_3$ | $-i-C_4H_9$ | 265 | 820 and 580 | 61 | 61 | — |
| 10 | diglyme | — | — | — | — | 400 | 1500 and 870 | 18 | 79 | — |

TABLE 2

| | Lewis base $R_1-O-CH_2-CH(R_2)-O-C(R_3)(R_4)-OR_5$ | | | | | | Monomers | | Time, minutes | Polymerization Conversion, % | Temp. °C. | Initiator, mmoles | Analysis | |
|---|---|---|---|---|---|---|---|---|---|---|---|---|---|---|
| Exp. | $R_1$ | $R_2$ | $R_3$ | $R_4$ | $R_5$ | ppm | Styrene, g | Butadiene, g | | | | | Bound styrene, % w | Vinyl content, % w |
| 1 | $C_2H_5-$ | $-H$ | $-H$ | $-CH_3$ | $-C_2H_5$ | 100 | 11.18 | 28.73 | 1.58 | 11.3 | 60 | 0.49 | 8.5 | 31.9 |
| | | | | | | 350 | 10.34 | 28.75 | 1.25 | 15.8 | | 0.55 | 11.8 | 49.7 |
| | | | | | | 600 | 12.35 | 28.41 | 1.00 | 17.1 | | 0.58 | 16.7 | 62.8 |
| 2 | $i-C_3H_7-$ | " | " | " | " | 100 | 10.31 | 28.74 | 1.83 | 11.4 | 60 | 0.48 | 6.3 | 27.2 |
| | | | | | | 350 | 10.47 | 28.75 | 1.33 | 12.3 | | 0.51 | 10.0 | 46.0 |
| | | | | | | 600 | 10.92 | 29.00 | 1.08 | 12.5 | | 0.52 | 11.8 | 54.5 |
| 3 | $n-C_4H_9-$ | " | " | " | " | 100 | 10.46 | 27.40 | 1.75 | 11.2 | 60 | 0.49 | 7.1 | 27.7 |
| | | | | | | 350 | 10.85 | 28.76 | 1.25 | 12.5 | | 0.50 | 10.2 | 43.1 |
| | | | | | | 600 | 10.91 | 28.48 | 1.00 | 13.1 | | 0.53 | 12.7 | 52.9 |
| 4 | $n-C_4H_9-$ | " | " | $-H$ | $-CH_3$ | 100 | 10.18 | 36.91 | 1.17 | 8.3 | 60 | 0.35 | 6.6 | 29.5 |
| | | | | | | 350 | 10.37 | 39.76 | 0.75 | 8.2 | | 0.37 | 11.3 | 47.9 |
| | | | | | | 600 | 10.31 | 37.73 | 0.58 | 10.3 | | 0.32 | 13.3 | 60.3 |
| 5 | $n-C_4H_9-$ | " | " | $-CH_3$ | $-i-C_4H_9$ | 100 | 10.14 | 41.38 | 2.00 | 5.0 | 50 | 0.28 | 5.5 | 36.7 |
| | | | | | | 350 | 10.03 | 40.93 | 2.00 | 9.5 | | 0.31 | 7.8 | 54.6 |
| | | | | | | 600 | 10.17 | 41.22 | 1.67 | 10.9 | | 0.31 | 8.9 | 61.6 |

What is claimed is:

1. A process for the preparation of polymers comprising conjugated dienes and optionally monoalkenyl aromatic hydrocarbons, which process comprises polymerizing conjugated diene and optionally monoalkenyl aromatic hydrocarbon monomers in the presence of a hydrocarbon diluent, a hydrocarbyl alkalimetal compound and a Lewis base, wherein the Lewis base is a compound having the formula

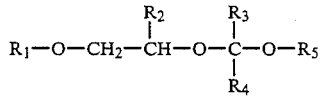

and wherein
$R_1$ is an alkyl group having 2-18 carbon atoms;
$R_2$ and $R_3$ are hydrogen or an alkyl groups having 1-4 carbon atoms;
$R_4$ is hydrogen or an alkyl group having 1-6 carbon atoms; and
$R_5$ is an alkyl group having 1-18 carbon atoms.

2. The process according to claim 1 wherein $R_1$ is an alkyl group having 3-6 carbon atoms, $R_2$ and $R_3$ are hydrogen, and $R_4$ and $R_5$ are alkyl groups having 1-4 carbon atoms.

3. The process according to claim 2 wherein $R_1$ is n-butyl, $R_2$ and $R_3$ are hydrogen, $R_4$ is methyl and $R_5$ is isobutyl.

4. The process according to any of claims 1-3 wherein the process comprises the preparation of homopolymers of conjugated dienes.

5. The process according to claim 1 wherein the process comprises the preparation of block copolymers of conjugated dienes and monoalkenyl aromatic hydrocarbons.

6. The process according to claim 1 wherein the process comprises the preparation of random copolymers of conjugated dienes and monoalkenyl aromatic hydrocarbons.

7. The process according to claim 1 wherein the hydrocarbyl alkalimetal compound is a hydrocarbyllithium compound.

8. The process according to claim 1 wherein the conjugated diene is isoprene or butadiene.

9. The process according to claim 1 wherein the monoalkenyl aromatic hydrocarbon is styrene.

10. The process according to claim 1 wherein subsequent to the polymerization the living polymers are coupled.

11. The process according to claim 10 wherein the living polymers are coupled by means of dibromoethane, diethyl adipate, $CH_3SiCl_3$ or $SiCl_4$.

* * * * *